(12) United States Patent
Erkinger et al.

(10) Patent No.: US 6,240,477 B1
(45) Date of Patent: May 29, 2001

(54) DATA BUS DEVICE WHICH REQUESTS ADDITIONAL INFORMATION AS WELL AS APPARATUS INFORMATION FROM DEVICES ATTACHED TO A DATA BUSH AND WHICH RETAINS THE ADDITIONAL INFORMATION WITH THE APPARATUS INFORMATION FOR FURTHER USE AFTER A BUS RESET

(75) Inventors: Erwin Erkinger; Günther Van Husen, both of Vienna (AT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/122,408

(22) Filed: Jul. 24, 1998

(30) Foreign Application Priority Data

Jul. 29, 1997 (EP) .................................. 97890151

(51) Int. Cl.[7] ..................................................... G06F 13/00
(52) U.S. Cl. ............................. 710/110; 710/16; 710/10; 709/202; 709/227; 709/228
(58) Field of Search .................................. 710/129, 8, 10, 710/11, 12, 16, 18, 36, 37, 62, 63, 67, 73, 110; 709/208, 217, 227, 228, 230

(56) References Cited

U.S. PATENT DOCUMENTS

| | | | |
|---|---|---|---|
| 5,402,115 | 3/1995 | Tanaka ................................. | 340/825 |
| 5,559,965 | * 9/1996 | Oztaskin et al. ..................... | 710/104 |
| 5,640,591 | * 6/1997 | Rossenthal et al. .................... | 710/3 |
| 5,659,795 | * 8/1997 | Duvall et al. .......................... | 710/15 |
| 5,671,441 | * 9/1997 | Glassen et al. ......................... | 710/8 |
| 5,675,794 | * 10/1997 | Meredith et al. ....................... | 713/1 |
| 5,826,046 | * 10/1998 | Nguyen et al. ...................... | 710/129 |
| 5,852,744 | * 12/1998 | Agatone et al. ...................... | 710/37 |
| 5,881,252 | * 3/1999 | Sahgal et al. ......................... | 710/104 |
| 5,922,056 | * 7/1999 | Amell et al. .......................... | 710/16 |
| 5,974,474 | * 10/1999 | Furner et al. ............................ | 710/8 |
| 5,999,989 | * 12/1999 | Patel ........................................ | 710/1 |

FOREIGN PATENT DOCUMENTS

| | | | |
|---|---|---|---|
| 0689296A2 | 12/1995 | (EP) | ................................. H04B/1/20 |
| 7131470A | 5/1995 | (JP) | ................................. H04L/12/40 |

OTHER PUBLICATIONS

Sony Camcorder DCR–PC7, Frequently Asked Questions, pp. 1–18, Jul. 24, 1997.

* cited by examiner

Primary Examiner—Robert Beausoleil
Assistant Examiner—Raymond N Phan
(74) Attorney, Agent, or Firm—Edward W. Goodman

(57) ABSTRACT

A data bus device (5) for cooperation with at least one apparatus (1) and for communicating with further data bus devices (10, 12, 14) via a data bus (7, 8, 9), each further data bus device (10, 12, 14) cooperating with at least one further apparatus (2, 3, 4), includes a data-bus set-up device (27) for generating a reference table containing data-bus device information (DI) for identifying the further apparatuses (2, 3, 4), a first memory (29) for storing the reference table, an additional-information request device (28) for requesting additional information (ZI) from further data bus devices (10, 12, 14) identified by stored data-bus device information (DI), and a second memory (31) for storing manufacturer's apparatus information (HI) identifying the apparatus (1, 2, 3) cooperating with the data bus device (5, 10, 12). The data bus device further includes an identification device which, after a first generation of a reference table by the data-bus set-up device (27) as a result of a connection of the data bus device (5) to the data bus (7, 8, 9), requests data-bus device information (HI) from all the further data bus devices (10, 12, 14) connected to the data bus, and stores the manufacturer's apparatus information (HI) received from the further data bus devices (10, 12, 14) in allocated relationship to the data-bus device information (DI) stored in the first memory (29).

9 Claims, 3 Drawing Sheets

| DI |
|---|
| 01 |
| 02 |
| 03 |
| 04 |

FIG. 2

| II | DI | HI | ZI | |
|---|---|---|---|---|
| 1 | 01 | 201323 | VR | ; 2000; ... |
| 2 | 02 | 201554 | STB | ; 2000; ... |
| 3 | 03 | 111543 | TV | ; 1500; ... |
| 4 | 04 | XXXXXX | PC | ; 500; ... |

FIG. 3

| DI | HI |
|---|---|
| 01 | 201554 |
| 02 | 201323 |
| 03 | XXXXXX |
| 04 | 111543 |

FIG. 4

| II | DI | HI | ZI | |
|---|---|---|---|---|
| 1 | 02 | 201323 | VR | ; 2000; ... |
| 2 | 01 | 201554 | STB | ; 2000; ... |
| 3 | 04 | 111543 | TV | ; 1500; ... |
| 4 | 03 | XXXXXX | PC | ; 500; ... |

FIG. 5

| DI | HI |
|---|---|
| 01 | 050010 |
| 02 | 201323 |
| 03 | XXXXXX |
| 04 | 201554 |
| 05 | 111543 |

FIG. 6

| II | DI | HI | ZI | | |
|---|---|---|---|---|---|
| 1 | 02 | 201323 | VR | ; 2000; | ... |
| 2 | 04 | 201554 | STB | ; 2000; | ... |
| 3 | 05 | 111543 | TV | ; 1500; | ... |
| 4 | 03 | XXXXXX | PC | ; 500; | ... |
| 5 | 01 | 050010 | VR | ; 3000; | ... |

FIG. 7

| DI | HI |
|---|---|
| 01 | 111543 |
| 02 | 201323 |
| 03 | XXXXXX |

FIG. 8

| II | DI | HI | ZI | | |
|---|---|---|---|---|---|
| 1 | 02 | 201323 | VR | ; 2000; | ... |
| 2 | XX | 201554 | S | ; 2000; | ... |
| 3 | 01 | 111543 | TV | ; 1500; | ... |
| 4 | 03 | XXXXXX | PC | ; 500; | ... |
| 5 | XX | 050010 | VR | ; 3000; | ... |

FIG. 9

DATA BUS DEVICE WHICH REQUESTS ADDITIONAL INFORMATION AS WELL AS APPARATUS INFORMATION FROM DEVICES ATTACHED TO A DATA BUSH AND WHICH RETAINS THE ADDITIONAL INFORMATION WITH THE APPARATUS INFORMATION FOR FURTHER USE AFTER A BUS RESET

BACKGROUND OF THE INVENTION

1. Field of the Invention

The invention relates to a data bus device intended for cooperation with at least one apparatus and constructed to communicate with further data bus devices which cooperate with at least one further apparatus via a data bus and comprising data-bus set-up means adapted to generate a reference table after the occurrence of a bus reset, the reference table containing data-bus device information for each further data bus device of a further apparatus connected to the data bus device, the data-bus device information identifying the further apparatus and its further data bus device until the next occurrence of a bus reset, and first memory means in which the data-bus device information contained in the reference table can be stored, and additional-information request means adapted to request additional information from a further data bus device identified by data-bus device information and to store received additional information in the first memory means in allocated relationship to the data-bus device information of the further data bus device, and communication means arranged to receive data from the apparatus which cooperates with the data bus device and adapted to supply the data to a further data bus device identified by data-bus device information, and second memory means which store manufacturer's apparatus information identifying the apparatus which cooperates with the data bus device.

The invention further relates to an apparatus including a data bus device constructed to communicate with further data bus devices which cooperate with at least one further apparatus via a data bus and comprising data-bus set-up means adapted to generate a reference table after the occurrence of a bus reset, the reference table containing data-bus device information for each further data bus device of a further apparatus connected to the data bus device, the data-bus device information identifying the further apparatus and its further data bus device until the next occurrence of a bus reset, and first memory means in which the data-bus device information contained in the reference table can be stored, and additional-information request means adapted to request additional information from a further data bus device identified by data-bus device information and to store received additional information in the first memory means in allocated relationship to the data-bus device information of the further data bus device, and communication means arranged to receive data from the apparatus including the data bus device and adapted to supply the data to a further data bus device identified by data-bus device information, and second memory means which store manufacturer's apparatus information identifying the apparatus including the data bus device.

2. Description of the Related Art

A data bus device of the type defined in the first paragraph and an apparatus of the type defined in the second paragraph are known, for example, from a commercially available and, consequently, known apparatus, namely, from a digital video camera marketed by Sony under the type number DCR-PC7. The known data bus device of the known apparatus is adapted to communicate with further known data bus devices in accordance with the data bus standards IEC1883, IEEE1394 and AV/C-CTS connected to the data bus. In the known data bus device, a bus reset is initiated when a further data bus device is connected to the data bus, or when a further data bus device is disconnected from the data bus, or when data transmission problems occur in the communication via the data bus of one of the apparatuses connected to the data bus. In order to identify data bus devices which are connected to the data bus, the data-bus set-up means of all the data bus devices connected to the data bus define data-bus device information, also known as physical ID, after every bus reset. Data-bus device information defined for a data bus device serves as address information for further data bus devices when data is transmitted to this data bus device.

After data-bus device information has been defined upon a bus reset, the additional information request means of the data bus device can request additional information from the further data bus devices connected to the data bus. Additional information can then be formed by information which specifies the nature of an apparatus which cooperates with a data bus device, i.e., whether said apparatus is, for example, a video recorder, a TV set, a set-top box or a personal computer. Moreover, additional information can be information which specifies the maximum data transmission rate of the data bus device, or a variety of further information relating to the data bus device or to an apparatus which cooperates with the data bus device. The first memory means of a first known data bus device can store additional information requested by the first data bus device and relating to a second known data bus device identified by second data-bus device information, storing being effected in a manner associated with the second data-bus device information of the known second data bus device.

However, it has been found that upon each occurrence of a bus reset in the known data bus device of the known apparatus, the additional information already stored in the first memory means can no longer be allocated to the data bus devices connected to the data bus as a result of the newly defined data-bus device information and must be requested again by the additional information request means. The new request for additional information considerably slows down the communication after a bus reset, as a result of which, the data bus must be designed for very high data transmission rates and the known data bus devices must have a high processing speed.

Moreover, it has been found that a communication between data bus devices connected to the data bus, which communication has been interrupted by a bus reset, can be delayed so long by the new request for additional information that the communication is wholly disrupted. This may result, for example, in an image dropout in the reproduction of a movie transmitted from a video recorder to a TV set via the data bus.

SUMMARY OF THE INVENTION

It is an object of the invention to eliminate the aforementioned problems and to provide an improved data bus device of the type defined in the first paragraph and an improved apparatus of the type defined in the second paragraph, in which the allocation of the additional information stored in the first memory means to the data bus devices connected to the data bus can simply be restored after a bus reset and, consequently, a new request for additional information is not necessary after a bus reset.

According to the invention this object is achieved in a data bus device of the type defined in the first paragraph in that there have been provided identification means which, after a first generation of a reference table by means of the data-bus set-up means as a result of a connection of the data bus device to the data bus, is adapted to request data-bus device information from all the further data bus devices, each being identified by respective data-bus device information contained in the reference table, and to store the manufacturer's apparatus information received from the further data bus devices in allocated relationship to the data-bus device information stored in the first memory means. Thus, it is achieved, in a simple manner, that the manufacturer's apparatus information of a further data bus device can be stored in the first memory means of the data bus device, in accordance with the invention, in a manner specified for the current data-bus device information and the associated additional information of the further data bus device. It is to be noted that manufacturer's apparatus information is constituted by a digit combination which enables each apparatus connected to the data bus to be identified unambiguously and independently of the occurrence of a bus reset. The manufacturer's apparatus information can be formed by, for example, 64-bit digit combination known as Uniqu-ID. Advantageously, an unambiguous allocation of additional information to apparatuses connected to the data bus is also possible after a bus reset.

In a data bus device in accordance with the invention having the characteristic features described above, it has further proved to be advantageous if, in addition, the data bus device includes comparison means which, after each subsequent generation of a reference table after the occurrence of a bus reset by the data-bus set-up means, is adapted to request manufacturer's apparatus information from a further data bus device identified by data-bus device information contained in the reference table, and to compare received manufacturer's apparatus information with manufacturer's apparatus information already stored in the first memory means and, in the case of matching of the received and the stored manufacturer's apparatus information, to store the data-bus device information already contained in the reference table in allocated relationship to the matching manufacturer's apparatus information of the further data bus device already stored in the first memory means. In this way, the additional information stored in the first memory means can be re-allocated particularly simply after a bus reset.

In a data bus device in accordance with the invention having the characteristic features described above, it has further proven to be advantageous if, in addition, if manufacturer's apparatus information received from a further data bus device identified by data-bus device information already contained in the reference table, and manufacturer's apparatus information already stored in the first memory means do not match, the comparison means is adapted to store the received manufacturer's apparatus information in the first memory means in allocated relationship to data-bus device information already contained in the reference table. Thus, additional information of data bus device not connected to the data bus before the occurrence of a bus reset, is also stored in the first memory means in a manner specified for the manufacturer's apparatus information of the data bus device.

In a data bus device in accordance with the invention having the characteristic features described above, it has further proven to be advantageous if, in addition, after termination of a comparison of all the manufacturer's apparatus information received from the further data bus devices which are each identified by data-bus device information already contained in the reference table with manufacturer's apparatus information already stored in the first memory means, the comparison means is adapted to store, in allocated relationship, identification information for each item of data-bus device information stored in the first memory means and additional information of further data bus devices to which no data-bus device information has been allocated after the last occurrence of a bus reset. In this way, additional information of data bus devices connected to the data bus before the occurrence of a bus reset and no longer connected to the data bus after the occurrence of the bus reset, remain stored in the first memory means. This additional information can be reallocated to the data bus device after re-connection of the data bus device to the data bus.

In a data bus device in accordance with the invention having the characteristic features described above, it has further proven to be advantageous if, in addition, the data bus device further comprises allocation means for generating and allocating device identity information for each item of manufacturer's apparatus information stored in the first memory means, and the communication means is arranged to receive data and associated device identity information from the apparatus which cooperates with the data bus device, and the communication means is adapted to supply the data to a further data bus device identified by the device identity information. In this way, it is achieved that processing means, provided in an apparatus which cooperates with a data bus device in accordance with the invention, can always address a given further data bus device connected to the data bus—and the further apparatus which cooperates with this further data bus device—with the same identity device information by means of the data bus device without being influenced by the occurrence of one or more bus resets. This has the advantage that, as a consequence, the processing means in apparatuses which cooperate with data bus devices in accordance with the invention, can be of a comparatively simple construction.

In a data bus device in accordance with the invention having the characteristic features described above, it has further proven to be also advantageous if, in addition, the data bus device is included in the apparatus which cooperates with said data bus device. Directly accommodating the data bus device in the apparatus which cooperates with this device, results in a particularly cheap and simple implementation.

In order to achieve the object mentioned hereinbefore in an apparatus of the type defined in the second paragraph, according to the invention, the data bus device includes identification means which, after a first generation of a reference table by means of the data-bus set-up means as a result of a connection of the data bus device to the data bus, is adapted to request data-bus device information from all the further data bus devices, which are each identified by respective data-bus device information contained in the reference table, and to store the manufacturer's apparatus information received from the further data bus devices in allocated relationship to the data-bus device information stored in the first memory means. In this way, the advantages already mentioned hereinbefore for a data bus device in accordance with the invention are obtained in an apparatus in accordance with the invention.

The aforementioned aspects as well as further aspects of the invention will be apparent from the embodiment described hereinafter by way of example and will be elucidated with reference to this embodiment.

BRIEF DESCRIPTION OF THE DRAWINGS

The invention will now be described in more detail with reference to the accompanying drawings, in which:

FIG. 2 shows, diagrammatically, a reference table generated in data-bus set-up means of the data bus device in accordance with the invention after a first bus reset, this first bus reset being initiated when the data bus device in accordance with the invention is connected for the first time to the data bus of the apparatus configuration shown in FIG. 1;

FIG. 3 shows, diagrammatically, a reference table stored in first memory means of the data bus device in accordance with the invention after the occurrence of the first bus reset, this reference table storing the additional information of apparatuses identified by data-bus device information and associated with manufacturer's apparatus information of these apparatuses;

FIG. 4 shows, diagrammatically, a further bus reference table generated in the data-bus set-up means of the data bus device in accordance with the invention after a second reset, manufacturer's apparatus information being stored in this bus reference table by identification means;

FIG. 5 shows, diagrammatically, a further reference table stored in the first memory means of the data bus device in accordance with the invention after the second occurrence of the bus reset, data-bus device information, defined after the second bus reset and associated with manufacturer's apparatus information of apparatuses connected to the data bus, being stored in this further reference table for these apparatuses;

FIG. 6 shows, diagrammatically, a reference table which is generated in the data-bus set-up means after the occurrence of a third bus reset initiated by connection of a further apparatus to the data bus of the apparatus configuration shown in FIG. 1, this reference table containing the data-bus device information and the manufacturer's apparatus information of the further apparatus;

FIG. 7 shows, diagrammatically, a further reference table which is stored in the first memory means after the connection of a further apparatus to the data bus of the apparatus configuration shown in FIG. 1, this further reference table containing the data-bus device information and the manufacturer's apparatus information of the further apparatus;

FIG. 8 shows, diagrammatically, a further reference table available in the data-bus set-up means after the disconnection of a further apparatus and an apparatus of the apparatus configuration of FIG. 1 from the data bus of the apparatus configuration of FIG. 1; and FIG. 9 shows, diagrammatically, a reference table stored in the first memory means after the disconnection of a further apparatus and an apparatus of the apparatus configuration of FIG. 1 from the data bus of the apparatus configuration of FIG. 1.

DESCRIPTION OF THE PREFERRED EMBODIMENTS

Figure 1:
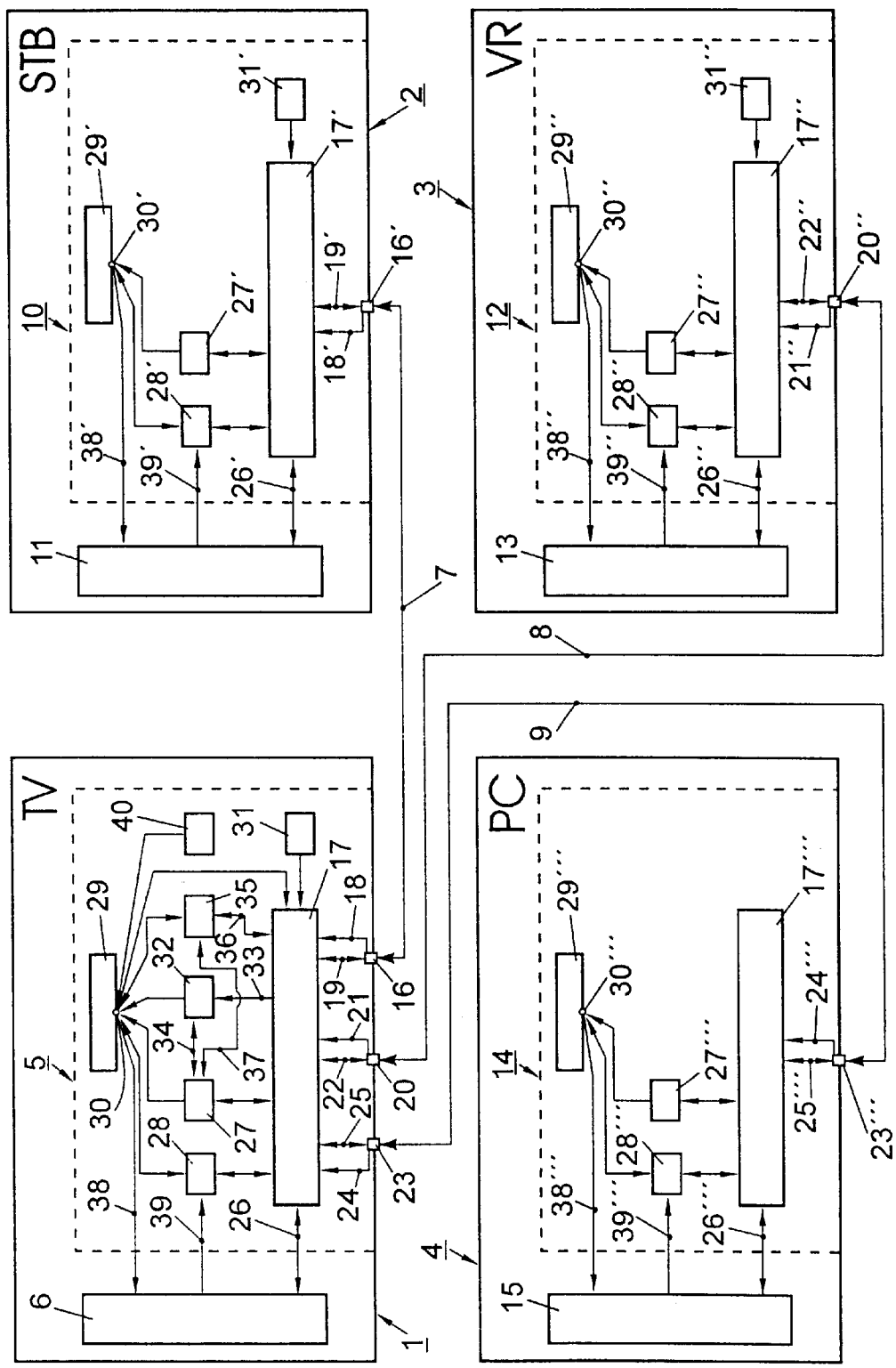
FIG. 1 shows a diagrammatic representation in the form of a block diagram of an apparatus configuration including a TV set, a set-top box, a video recorder and a personal computer, the TV set accommodating a data bus device in accordance with a first embodiment of the invention, the data bus device being adapted to communicate with further data bus devices provided in the set-top box, the video recorder and the personal computer via a data bus.

FIG. 1 shows a diagrammatic representation, in the form of a block diagram, of an apparatus configuration including a TV set 1, a set-top box 2, a video recorder 3 and a personal computer 4. The TV set 1 accommodates a data bus device in accordance with a first embodiment of the invention, hereinafter referred to as the TV data bus device 5. The TV data bus device 5 is adapted to cooperate with the TV set 1, which is essentially formed by TV processing means 6. In the present case, the TV data bus device 5 is disposed in the TV set 1 which cooperates with this device, i.e., it is incorporated in the TV set 1. The TV data bus device 5 is adapted to communicate with known data bus devices provided in the set-top box 2, the video recorder 3 and the personal computer 4, via a data bus formed by a first data bus line 7, a second data bus line 8 and a third data bus line 9.

The set-top box 2 comprises a known data bus device, hereinafter referred to as the STB data bus device 10. The STB data bus device 10 is adapted to cooperate with STB processing means 11, which essentially form the set-top box 2, and to communicate with the TV data bus device 5 via the first data bus line 7.

The video recorder 3 comprises a known data bus device, hereinafter referred to as the VR data bus device 12. The VR data bus device 12 is adapted to cooperate with VR processing means 13, which essentially form the video recorder 3, and to communicate with the TV data bus device 5 via the second data bus line 8.

The personal computer 4 comprises a known data bus device, hereinafter referred to as the PC data bus device 14. The PC data bus device 14 is adapted to cooperate with PC processing means 15, which essentially form the personal computer 4, and to communicate with the TV data bus device 5 via the third data bus line 9.

The TV data bus device 5 comprises a first connector 16 into which the first data bus line 7 is plugged. The TV data bus device 5 further comprises communication means 17 constituted by a microcomputer and having a first control line 18 arranged to receive connection information. When a data bus line has been plugged into the first connector 16, connection information is supplied from the first connector 16 to the communication means 17. Conversely, if no data bus line has been plugged into the first connector 16, no connection information is supplied to the communication means 17. The first connector 16 is further connected to the communication means 17 via a first data line 19.

The TV data bus device 5 further has a second connector 20 into which the second data bus line 8 is plugged and which is connected to the communication means 17 via a second control line 21 and a second data line 22.

The TV data bus device 5 further has a third connector 23 into which the third data bus line 9 is plugged and which is connected to the communication means 17 via a third control line 24 and a third data line 25.

The communication means 17 is connected to the TV processing means 6 via a first connection line 26. Data received by the TV data bus device 5 via the first data bus line 7 or the second data bus line 8 or the third data bus line 9 can be supplied to the TV processing means 3 via the first connection line 26. For example, a digital video signal supplied by the video recorder 3 can then be applied to the communication means 17 via the second data bus line 8, the second connector 20 and the second data line 22 and to the TV processing means 6 via the first connection line 26 in order to reproduce the digital video signal.

The TV processing means 6 can supply data together with address information formed by data-bus device information DI which includes information identifying the data bus device to which the data is to be transmitted. For example, data processed in a teletext decoder, not shown, of the TV processing means 6, together with data-bus device information DI, which identifies the PC data bus device 14, can then be applied to the PC data bus device 14 via the first connection line 26, the communication means 17, the third data line 25, the third connector 23 and the third data bus line 9 and, finally, to the PC processing means 15 in order to be processed.

When data together with data-bus device information DI is applied to the communication means 17, the data-bus device information DI identifying a further data bus device, the communication means 17 is adapted to supply the data together with the data-bus device information DI to the further data bus device. For example, data together with data-bus device information DI which identifies the PC data bus device 14 can then be supplied from the STB data bus device 10 to the communication means 17 via the first data bus line 7, the first connector 16 and the first data line 19. The communication means 17 is then adapted to supply the received data together with the data-bus device information DI to the PC data bus device 14 via the third data line 25, the third connector 23 and the third data bus line 9.

The TV data bus device 5 further comprises data-bus set-up means 27 and additional-information request means 28, both the data-bus set-up means 27 and the additional-information request means 28 being connected to the communication means 17. The TV data bus device 5 comprises first memory means 29 to which data to be stored can be applied via a port 30 and which can supply data read out of the first memory means via the port 30. Both the data-bus set-up means 27 and the additional-information request means 28 are connected to the port 30 of the first memory means 29. The communication means 17 is connected to the port 30 of the first memory means 29 for reading out information stored in the first memory means 29.

The TV data bus device 5 further comprises second memory means 31 which is formed by a ROM and stores manufacturer's apparatus information HI which identifies the TV data bus device 5 which cooperates with the TV set 1. In the present case, the manufacturer's apparatus information HI is formed by a six-digit combination which is stored unalterably in the second memory means 31 during the manufacture of the TV set 1, and which enables the TV set 1 to be identified unambiguously among other apparatuses which can be connected to the data bus.

The TV data bus device 5 comprises identification means 32 arranged to receive the manufacturer's apparatus information HI from the communication means 17 via a second connection line 33 and adapted to supply the manufacturer's apparatus information HI to the port 30 of the first memory means 29. The identification means 32 is connected to the data-bus set-up means 27 via a third connection line 34.

The TV data bus device 5 further comprises comparison means 35 connected to the communication means 17 via a fourth connection line 36 and to the data-bus set-up means 27 via a fifth connection line 37. The comparison means 35 is connected to the port 30 of the first memory means 29 for reading information from the first memory means 29 and for storing information in the first memory means 29. The TV data bus device 5 further comprises allocation means 40 connected to the port 30 of the first memory means 29 for the storage of device identity information II in the first memory means 29.

Information stored in the first memory means 29 can be supplied to the port 30 and can be read out by the TV processing means 6 via an information line 38. The TV processing means 6 is further connected to the additional-information request means 28 via a request line 39.

The STB data bus device 10, similarly to the TV data bus device 5, comprises a first connector 16' into which the first data bus line 7 is plugged. Connection information can be applied to communication means 17' via a first control line 18' and data can be applied to the communication means 17' via a first data line 19'. The communication means 17' of the STB data bus device 10 is connected to data-bus set-up means 27', to additional-information request means 28' and, via a first connection line 261, to the STB processing means 11. The data-bus set-up means 27' and the additional-information request means 28' are each connected to a port 30' of first memory means 29'. The STB processing means 11 is connected to the port 30' of the first memory means 29' via an information line 38', and to the additional-information request means 28' via a request line 39'. The STB data bus device 10 further comprises second memory means 31' for storing manufacturer's apparatus information HI which identifies the set-top box 2.

The VR data bus device 12, similarly to the TV data bus device 5, has a second connector 20" into which the second data bus line 8 is plugged. Connection information can be applied to communication means 17" via a second control line 21", and data can be applied to the communication means 17" via a second data line 22". The communication means 17" of the VR data bus device 12 is connected to data-bus set-up means 27", to additional-information request means 28" and, via a first connection line 26", to the VR processing means 13. The data-bus set-up means 27" and the additional-information request means 28" are connected to a port 30" of first memory means 29". The VR processing means 13 is connected to the first memory means 29" and to the additional-information request means 28" via a request line 39". The VR data bus device 12 further comprises second memory means 31" for storing manufacturer's apparatus information HI which identifies the video recorder 3.

The PC data bus device 14, similarly to the TV data bus device, comprises a third connector 23''' into which the third data bus line 9 is plugged. Connection information can be applied to communication means 17''', and data can be applied to the communication means 17''' via a third data line 25'''. The communication means 17''' of the PC data bus device 14 is connected to data-bus set-up means 27''', to additional-information request means 28''' and, via a first connection line 26''', to the PC processing means 15. The data-bus set-up means 27''' and the additional-information request means 28''' are connected to a port 30''' of first memory means 29'''. The PC processing means 15 is connected to the first memory means 29''' via an information line 38''', and to the additional-information request means 28''' via a request line 39'''. It is to be noted that the PC data bus device 14 does not comprise second memory means and is, consequently, not adapted to supply manufacturer's apparatus information which identifies the personal computer 4.

When a bus reset is caused by one of the data bus devices in the apparatus configuration shown in FIG. 1, the bus rest activates a data-bus set-up process in accordance with the IEEE 1394 standard in all the data-bus set-up means 27, 27', 27" and 27''', in which the respective data-bus set-up means define new data-bus device information DI for the respective data bus device connected to the data bus after the occurrence of the bus reset. A bus reset can be produced by connection of a further data bus device to the data bus, by a further data bus device being disconnected from the data bus, or by data transmission problems in the communication via the data bus of a data bus device connected to the data bus.

When, for example, the first data bus line 7 is removed from the first connector 16, the communication means 17 detects the absence of connection information from the first connector 16 and applies a bus reset to the VR data bus device 12 connected to the TV data bus device 5 and to the PC data bus device 14. When, for example, the second data bus line 8 is disconnected from the second connector 20' of the VR data bus device 12 the communication means 17 detects the absence of the VR data bus device 12, which was previously connected to the TV data bus device 5, and the communication means 17 generates a bus reset, which is applied to the STB data bus device 10 and the PC data bus device 14.

After the occurrence of a bus reset, the data-bus set-up means 27 of the TV data bus device 5, the data-bus set-up means 27' of the STB data bus device 10, the data-bus set-up means 27" of the VR data bus device 12 and the data-bus set-up means 27'" of the PC data bus device 14 redefine data-bus device information DI in the data-bus set-up process, which proceeds in accordance with the IEEE 1394 standard. It is to be noted that even in the case of a fully identical apparatus configuration, the definition of the data-bus device information DI may lead to an entirely different definition of data-bus device information DI for the individual data bus devices connected to the data bus. If the data-bus device information DI for the TV data bus device 5 is defined as the number "03", the respective data-bus set-up means 27, 27', 27", 27'" may define the data-bus device information DI for the TV data bus device 5 as the number "04" after the occurrence of a bus reset.

When a bus reset occurs in the apparatus configuration shown in FIG. 1 and the data bus is set up again by the respective data-bus set-up means 27, 27', 27", 27'" in that new data-bus device information DI is defined in the data-bus set-up process, a reference table generated in the respective data-bus set-up means 27, 27', 27", 27'" will contain four entries of data-bus device information DI, which are characteristic of the presence of four data bus devices connected to the data bus, after termination of the data-bus set-up process. FIG. 2 shows a reference table which initially only contains data-bus device information DI, namely, the numbers "01", "02", "03" and "04". The data-bus set-up means 27 can supply the reference table to the port 30 of the first memory means 29 in order to store the data-bus device information DI contained in the reference table. FIG. 3 shows additional information Z1 stored in the first memory means 29.

The additional-information request means 28 provided in the TV data bus device 5 is adapted to request additional information Z1 from a further data bus device identified by data-bus device information DI and connected to the data bus, and to store received additional information ZI in the first memory means 29 so as to be allocated to the data-bus device information DI of the further data bus device. To this end, the additional-information request means 28 is adapted to read out the first data-bus device information DI stored in the first memory means 29. This first data-bus device information DI, which—as is shown in FIG. 3—is formed by the number "01", is supplied from the additional-information request means 28 to the communication means 17 as address information together with request information as additional-information-request information. By means of the data-bus device information DI—i.e., by means of the number "01"—defined for the VR data bus device 12 after the occurrence of the last bus reset, the communication means 17 is adapted to supply the additional-information-request information to the VR data bus device 12 via the second data bus line 8. The VR processing means 13 of the video recorder 3 comprises a configuration memory, which is not shown in FIG. 1, this memory storing the additional information ZI about the video recorder 3. When additional-information-request information occurs in the communication means 17" of the VR data bus device 12, the communication means 17" is adapted to retrieve the additional information ZI in the configuration memory of the VR processing means 13 via the first connection line 26". Additional information ZI can then be information which indicates that the video recorder 3 is suitable for recording and reproducing digital video signals in accordance with the DVHS standard. Furthermore, additional information ZI may include information which indicates that the video recorder 23 is in a play mode. Moreover, additional information ZI may include information which indicates that the VR data bus device 12 is adapted to transmit data at a maximum data rate of 2000 baud. The additional information ZI can also be formed by a variety of other information.

The additional information ZI requested by the TV data bus device 5 can be applied from the communication means 17" of the VR data bus device 12 to the communication means 17 of the TV data bus device 5 via the second data bus line 8. Additional information ZI requested from the VR data bus device 12 by the additional-information request means 28 of the TV data bus device 5 and received by the communication means 17 can be applied to the additional-information request means 28. The additional information ZI applied to the additional-information request means 28 can be stored in the first memory means 29 of the TV data bus device 5 by the additional-information request means 28 so as to be allocated to the data-bus device information DI of the VR data bus device 12. As is shown in FIG. 3, the additional information ZI of the VR data bus device 12, which is now formed by the information "VR" and "2000", is stored in the same row as the data-bus device information "01" of the VR data bus device 12, so that an allocation is achieved.

Likewise, the additional-information request means 28 is adapted to request additional information ZI from all the data bus devices connected to the data bus and identified by data-bus device information DI stored in the first memory means 29. It is to be noted here, that the additional-information request means 28 of the TV data bus device 5 can be adapted to request the additional information ZI from all the data bus devices connected to the data bus after a first generation of a reference table in response to a connection of the TV data bus device 5 to the data bus.

Furthermore, it is to be noted that the additional-information request means 28 can be constructed in such a manner that it requests additional information ZI for a given apparatus only in response to a request for additional information ZI of said give apparatus, this request being transmitted from the TV processing means 6 to the additional-information request means 28 via the request line 39. When, for example, a digital television signal displayed by the TV processing means 6 is to be recorded, the TV processing means 6 can transmit additional information ZI to the additional-information request means 28 via the request line 39 in order to detect a suitable recording apparatus for digital television signals. Upon completion of the request and the storage of additional information ZI about recording apparatuses suitable for the recording of digital television signals, the TV processing means 6 can determine a suitable apparatus, for example, the video recorder 3 or the personal computer 4, by reading the additional information ZI out of the first memory means 29 via the information line 38.

After a first generation of a reference table by the data-bus set-up means 28 in response to a connection of the TV data bus device 5 to one of the data bus lines 7, 8 or 9, the identification means 32 provided in the TV data bus device 5 is adapted to request manufacturer's apparatus information HI from any one of the further data bus devices identified by data-bus device information DI specified in the reference table and to store the manufacturer's apparatus information HI received from the further data bus devices so as to allocated it to the data-bus device information DI stored in the first memory means 29.

When the TV data bus device 5 of the TV set 1 is connected to one of the data bus lines 7, 8 or 9 of the data bus for the first time, the identification means 32 is adapted to read out the reference table in the data-bus set-up means 27 via the third connection line 34 upon termination of the data-bus set-up process. The identification means 32 first of all reads the first data-bus device information DI from the reference table. This first data-bus device information DI, which is formed by the number "01", is applied to the communication means 17 as address information together with request information for requesting the manufacturer's apparatus information HI from the data bus device identified by the first data-bus device information DI. By means of the data-bus device information DI, which has been defined after the occurrence of the last bus reset for the VR data bus device 12, the communication means 17 is adapted to supply request information to the VR data bus device 12 via the second data bus line 8. When manufacturer's apparatus information occurs in the communication means 17" of the VR data bus device 12, the communication means 17" is adapted to request the manufacturer's apparatus information HI of the VR data bus device 12 stored in the second memory means 31". The manufacturer's apparatus information HI requested by the identification means 32 of the TV data bus device 5 can be supplied from the communication means 17" of the VR data bus device 12 to the communication means 17 of the TV data bus device 5 via the second data bus line 8. The manufacturer's apparatus information HI requested by the identification means 32 of the TV data bus device from the VR data bus device 12 and received in the communication means 17 can be applied to the identification means 32. The manufacturer's apparatus information HI applied to the identification means 32 can be stored in the first memory means 29 of the TV data bus device 5 by the identification means 32 so as to be allocated to the data-bus device information DI of the VR data bus device 12. As is shown in FIG. 3, the manufacturer's apparatus information HI of the VR data bus device 12, in the present case formed by the digit combination "201223", is stored in the same row as the data-bus device information "01", so that an allocation is achieved.

Likewise, the identification means 32 is adapted to request manufacturer's apparatus information HI from all the data bus devices connected to the data bus and identified by data-bus device information DI stored in the first memory means 29.

This yields the advantage that manufacturer's apparatus information HI, which allows an unambiguous identification of an apparatus connected to the data bus, is stored so as to be allocated to the additional information ZI of this apparatus as stored in the first memory means 29, as a result of which, the additional information ZI can also be allocated unambiguously to the individual apparatuses after the occurrence of a bus reset.

It is to be noted here, that the PC data bus device 14 complies with the standard IEEE 1394 but not with the standard IEC 1883 based on the standard IEEE 1394, for which reason the PC data bus device 14 does not comprise second memory means which store manufacturer's apparatus information HI. Consequently, the identification means 32 of the TV data bus device 5 cannot store manufacturer's apparatus information HI in the first memory means 29 of the TV data bus device 5. In this case, manufacturer's apparatus information HI formed by the character combination "XXXXXX", as shown in FIG. 3, is stored in the first memory means 29.

If, in the apparatus configuration shown in FIG. 1, only one apparatus is connected to the data bus, this apparatus not having second memory means and, consequently, not having a manufacturer's apparatus information HI stored in it for the unambiguous identification of the data bus device of the apparatus, the additional information ZI stored in the first memory means 29 can be allocated to the one non-identifiable apparatus with a high probability after the occurrence of a bus reset and after the identification of the other apparatuses connected to the data bus. Alternatively, the stored additional information ZI can be allocated to a non-identified apparatus with a high probability in that a part of the additional information ZI of an apparatus not identified by manufacturer's apparatus information HI is called by aid of the additional-information request means 8, and in that the received additional information ZI is compared with additional information ZI which has been stored in the first memory means 29 but for which no allocated manufacturer's apparatus information HI has been stored.

It is to be noted here that it may be advantageous if, after termination of a data-bus set-up process, first of all, the manufacturer's apparatus information HI, allocated to the data-bus device information DI, is stored in the first memory means 29 with the aid of the identification means 32 and, subsequently, additional information ZI of apparatuses connected to the data bus and already identified unambiguously is requested with the additional-information request means 28 and is stored in an allocated relationship in the first memory means 29. This sequence is particularly advantageous when a bus reset occurs during the request for additional information ZI by the additional-information request means 28.

The comparison means 35 provided in the TV data bus device 5 is adapted to request manufacturer's apparatus information HI of a further data bus device identified by data-bus device information DI in the reference table after each subsequent new generation of a reference table upon the occurrence of a bus reset, and to compare received data-bus device information HI with the manufacturer's apparatus information HI already stored in the first memory means 29. The comparison means 35 is adapted to store, in the case of matching of the received and the stored manufacturer's apparatus information HI, the data-bus device information DI already contained in the reference table in an allocated relationship to the corresponding data-bus device information HI of the further data bus device as already stored in the first memory means 29.

If a bus reset occurs in the apparatus configuration shown in FIG. 1 and the first memory means 29 already contains data-bus device information DI, manufacturer's apparatus information HI and additional information ZI in allocated relationship—as shown in FIG. 3—the comparison means 35 is adapted to request, after termination of the data-bus set-up process, the data-bus device information HI from the data bus devices identified by the data-bus device information DI of the reference table shown in FIG. 4. For this purpose, the comparison means 35, first of all, reads out the first data-bus device information DI contained in the reference table. This first data-bus device information DI, which as shown in FIG. 4 is represented by the number "0", is applied to the communication means 17 as address information together with request information as manufacturer request information. By means of the data-bus device information DI, defined for the STB data bus device 10 after the occurrence of the last bus reset, the communication means 17 is adapted to supply the manufacturer's apparatus information to the STB data bus device 10 via the first data bus line 7. When manufacturer request information occurs in the communication means 17' of the STB data bus device 10, the communication means 17' is adapted to read out the manufacturer's apparatus information HI of the STB data bus device 10 stored in the second memory means 31'.

The manufacturer's apparatus information HI requested by the comparison means 35 of the TV data bus device 5 can be applied from the communication means 17' of the STB data bus device 10 to the communication means 17 of the TV data bus device 5 via the first data bus line 7. The manufacturer's apparatus information HI received by the communication means 17 in the comparison means 35 can be applied from the comparison means 35 to the data-bus set-up means 27 via the fifth connection line 37. The manufacturer's apparatus information HI of the STB data bus device 10, supplied to the data-bus set-up means 27 and formed by the digit combination "201554", can be entered into the reference table shown in FIG. 4 by the data-bus set-up means 27 in an allocated relationship to the data-bus device information DI of the STB data bus device 10, which is formed by the number "01" in the present case.

Likewise, data-bus device information HI requested by the comparison means 35 and relating to data bus devices connected to the data bus after the occurrence of a bus reset, these data bus devices comprising second memory means, can be entered into the reference table in an allocated relationship. For a data bus device for which no manufacturer's apparatus information HI is received in the communication means 17, manufacturer's apparatus information HI formed by the character combination "XXXXXX" is entered into the reference table in the data-bus set-up means 27 of the TV data bus device 5, allocated to the data-bus device information DI of the data bus device which is not identified by manufacturer's apparatus information HI.

After the entry of all the manufacturer's apparatus information HI in the reference table, the comparison means 35 is adapted to compare the first manufacturer's apparatus information HI entered into the reference table with the manufacturer's apparatus information HI already stored in the memory means 29. After detection of matching of the first manufacturer's apparatus information HI entered into the reference table—i.e., the digit combination "201554"— with the second manufacturer's apparatus information HI loaded into the first memory means 29—as shown in FIG. 5—the comparison means 35 is adapted to store the data-bus device information DI, in the present case formed by the number "01" and allocated to this data-bus device information HI in the reference table, in the first memory means 29 in an allocated relationship.

Likewise, the comparison means 35 is adapted to compare all the other manufacturer's apparatus information HI in the reference table with manufacturer's apparatus information HI already stored in the first memory means 29 and, in the case of matching of the manufacturer's apparatus information HI, to store data-bus device information DI, which has been entered into the reference table in allocated relationship to an item of manufacturer's apparatus information HI, in allocated relationship to the manufacturer's apparatus information HI stored in the first memory means 29. In this way, re-allocation of additional information ZI stored in the first memory means 29 to data bus devices connected to the data bus is possible after a bus reset and can be effected in a particularly simple manner.

It is to be noted here, that in a data bus in accordance with the IEEE 1394 standard, a communication interrupted by a bus reset is discontinued if the data-bus set-up process and the call for additional information ZI for the identification of the data bus devices communicating before the bus reset is not terminated within one second. The TV data bus device 5 in accordance with the invention has the advantage that additional information ZI already stored in the first memory means 29 need not be called again, as a result of which a communication interrupted by a bus reset can be restored particularly rapidly.

If, in the apparatus configuration shown in FIG. 1, a further data bus device—for example, a second video recorder not shown in FIG. 1—is connected to the data bus, new data-bus device information DI is defined during the data-bus set-up process performed upon the bus reset and further data-bus device information DI for the second video recorder is entered into the reference table shown in FIG. 6. Subsequently, the comparison means 35 enters the manufacturer's apparatus information HI of the apparatuses connected to the data bus into the reference table, as has already been explained hereinbefore.

If no manufacturer's apparatus information HI corresponding to manufacturer's apparatus information HI contained in the reference table is found in the first memory means 29, the comparison means 35 is, in addition, adapted to store said manufacturer's apparatus information HI contained in the reference table in an allocated relationship to the data-bus device information DI allocated to it in the reference table.

When the comparison means 35 compares the first manufacturer's apparatus information HI entered into reference table, this information being formed by the digit combination "050010", with the manufacturer's apparatus information HI already stored in the first memory means 29 and shown in FIG. 5, the comparison means 35 detect that there is no match. The manufacturer's apparatus information HI with the digit combination "050010", which identifies the second video recorder which was not connected to the data bus before the occurrence of the last bus reset, is stored in the first memory means 29 by the comparison means 35 in allocated relationship to the data-bus device information DI of the second video recorder. FIG. 7 shows the reference table stored in the first memory means 29 and containing the manufacturer's apparatus information HI of the second video recorder.

Therefore, if there is no match between manufacturer's apparatus information HI received from a further data bus device identified by data-bus device information DI already contained in the reference table and manufacturer's apparatus information HI already stored in the first memory means 29, the comparison means 35 is adapted to store the received manufacturer's apparatus information HI in the first memory means 29 in allocated relationship to the data-bus device information DI already contained in the reference table. In this way, additional information ZI of data bus device not connected to the data bus before the occurrence of a bus reset is also stored in the first memory means 29 in allocated relationship to the manufacturer's apparatus information HI of the data bus device.

When, in the apparatus configuration shown in FIG. 1, the set-top box 2 and the second video recorder, not shown, which is additionally connected to the data bus, are disconnected from the data bus, for example, the reference table of FIG. 8 is available in the data-bus set-up means 27 after the data-bus set-up process initiated by the bus reset and the request for and entry of manufacturer's apparatus information HI by the comparison means 35 into the reference table of the data-bus set-up means 27. Upon termination of the comparison of the manufacturer's apparatus information HI entered in the reference table with the manufacturer's apparatus information HI stored in the first memory means 29, the comparison means 35 is adapted to store characteristic information, in the present case formed by characters "XXX", for the manufacturer's apparatus information HI stored in the first memory means 29 and not contained in the reference table.

In this case, as is shown in FIG. 9, characteristic information is entered as data-bus device information DI for the set-top box 2 which has been disconnected from the data bus and the second video recorder which has been disconnected from the data bus. The manufacturer's apparatus information HI and the additional information ZI of these apparatuses remain stored in the first memory means 29.

Therefore, upon termination of the comparison of all the manufacturer's apparatus information HI received from the further data bus devices identified by data-bus device information DI already contained in the reference table with manufacturer's apparatus information HI already stored in the first memory means 29, the comparison means 35 is adapted to store identification information in allocated relationship to the respective manufacturer's apparatus information HI and additional information ZI stored in the first memory means 29, this information relating to further data bus devices to which no data-bus device information DI has been allocated after the last occurrence of a bus reset. It is advantageous that the additional information ZI of the STB data bus device 10 and of the second video recorder, connected to the data bus before the occurrence of the bus reset and no longer connected to the data bus after the occurrence of the bus reset, remain stored in the first memory means 29. After re-connection of the STB data bus device 10 or the second video recorder to the data bus, this additional information ZI can be re-allocated to the STB data bus device 10 and the second video recorder.

The allocation means 40 included in the TV data bus device 5 serves for generating and storing identity information II in allocated relationship to the respective manufacturer's apparatus information HI stored in the first memory means 29, as is shown in FIG. 3, FIG. 5, FIG. 7 and FIG. 9. Advantageously, the TV processing means 6 can now supply the device identity information II of an apparatus connected to the data bus to the communication means 17 as address information independently of the occurrence of one or more bus resets. The communication means 17 is then adapted to read out the data-bus device information DI which is stored in the first memory means 29 in allocated relationship to this device identity information II. The communication means 17 is adapted to supply the data supplied by the TV processing means 6 together with the device identity information II to the data bus device identified by the data-bus device information DI. This yields the advantage that the TV processing means 6, which cooperates with the data bus device in accordance with the invention, i.e., with the TV data bus device 5, can be of comparatively simple construction because the TV data bus device 5 need not process new address information after every bus reset.

It is advantageous to accommodate the TV data bus device 5 directly in the TV set 1. This results in a particularly cheap and simple realization of a TV set with a data bus device in accordance with the invention.

It is to be noted that device identity information II need not be stored in the first memory means 29 in an allocated relationship because an allocation can also be defined by the sequence of storage of information in the first memory means 29. This is possible, for example, in that, automatically, the device identity information II with the number "1" is allocated to data-bus device information DI and manufacturer's apparatus information HI plus allocated additional information ZI stored in the first memory means 29 starting from the first storage location in the first memory means 29. The second device identity information II with the number "2" is automatically allocated to the data-bus device information DI and manufacturer's apparatus information HI plus additional information ZI stored in the first memory means 29 directly after this information. Further device identity information II is likewise allocated to further information stored subsequently in the first memory means 29.

It is to be noted that manufacturer's apparatus information HI with additional information ZI stored in allocated relationship for apparatuses which are no longer connected to the data bus remains stored in the first memory means 29 until the storage capacity of the first memory means 29 is exhausted and the storage capacity for manufacturer's apparatus information HI and additional information ZI is occupied by further apparatuses connected to the data bus.

It is to be noted that the comparison means 35 can be adapted to compare the received manufacturer's apparatus information HI with the manufacturer's apparatus information HI stored in the first memory means 29, in order to detect matching, immediately after having received manufacturer's apparatus information HI rather than after having received all the manufacturer's apparatus information HI.

It is to be noted that additional information ZI stored in the first memory means 29 need not necessarily called by the additional-information request means 28 via the data bus but that, for example, also additional information ZI entered by a user of an apparatus can be stored via further apparatuses connected to the data bus in the first memory means 29 in allocated relationship to the manufacturer's apparatus information HI of these further apparatuses.

It is to be noted that data bus devices in accordance with the invention are also suitable for setting up other data buses which do not comply with the IEEE 1394 standard, for which reason, the use of the data bus devices in accordance with the invention is not limited to data buses in accordance with the IEEE 1394 standard.

What is claimed is:

1. A data bus device for cooperating with at least one apparatus and constructed to communicate with further data bus devices each cooperating with at least one further apparatus via a data bus, said data bus device comprising:

means for setting up said data bus device, said setting up means generating a reference table after the occurrence of a bus reset, the reference table containing data-bus device information for each further data bus device of a further apparatus connected to the data bus device, said data-bus device information identifying the further apparatus and the cooperating further data bus device until a next occurrence of a bus reset;

first means for storing the data-bus device information contained in the reference table;

means for requesting additional information from a further data bus device identified by data-bus device information, and for storing received additional information in the first storing means in allocated relationship to the data-bus device information of the further data bus device;

means for receiving data from the apparatus cooperating with the data bus device, and for supplying the data to a further data bus device identified by data-bus device information; and second means for storing manufacturer's apparatus information identifying the apparatus which cooperates with the data bus device, characterized in that said data bus device further comprises:

means for requesting manufacturer's apparatus information, after a first generation of a reference table by the setting up means as a result of a connection of the data bus device to the data bus, from all the further data bus devices each identified by respective data-bus device information contained in the reference table, and for storing the manufacturer's apparatus information received from the further data bus devices in allocated relationship to the data-bus device information stored in the first storing means; and means for requesting, after each subsequent generation of a reference table after the occurrence of a bus reset by the setting up means, manufacturer's apparatus information from a further data bus device identified by data-bus device information contained in the reference table, and for comparing received manufacturer's apparatus information with manufacturer's apparatus information already stored in the first storing means, said requesting and comparing means, in the case of matching of the received and the stored manufacturer's apparatus information, further storing the data-bus device information already contained in the reference table in allocated relationship to the matching manufacturer's apparatus information of the further data bus device already stored in the first storing means.

2. The data bus device as claimed in claim 1, characterized in that said requesting and comparing means, if manufacturer's apparatus information received from a further data bus device identified by data-bus device information already contained in the reference table, and manufacturer's apparatus information already stored in the first storing means do not match, further stores the received manufacturer's apparatus information in the first storing means in allocated relationship to data-bus device information already contained in the reference table.

3. The data bus device as claimed in claim 1, characterized in that said requesting and comparing means, after termination of a comparison of all the manufacturer's apparatus information received from the further data bus devices which are each identified by data-bus device information already contained in the reference table with manufacturer's apparatus information already stored in the first storing means, further stores, in allocated relationship, identification information for each item of data-bus device information stored in the first storing means and additional information of further data bus devices to which no data-bus device information has been allocated after the last occurrence of a bus reset.

4. A data bus device for cooperating with at least one apparatus and constructed to communicate with further data bus devices each cooperating with at least one further apparatus via a data bus, said data bus device comprising:

means for setting up said data bus device, said setting up means generating a reference table after the occurrence of a bus reset, the reference table containing data-bus device information for each further data bus device of a further apparatus connected to the data bus device, said data-bus device information identifying the further apparatus and the cooperating further data bus device until a next occurrence of a bus reset;

first means for storing the data-bus device information contained in the reference table;

means for requesting additional information from a further data bus device identified by data-bus device information, and for storing received additional information in the first storing means in allocated relationship to the data-bus device information of the further data bus device;

means for receiving data from the apparatus cooperating with the data bus device, and for supplying the data to a further data bus device identified by data-bus device information; and second means for storing manufacturer's apparatus information identifying the apparatus which cooperates with the data bus device, characterized in that said data bus device further comprises:

means for requesting manufacturer's apparatus information, after a first generation of a reference table by the setting up means as a result of a connection of the data bus device to the data bus, from all the further data bus devices each identified by respective data-bus device information contained in the reference table, and for storing the manufacturer's apparatus information received from the further data bus devices in allocated relationship to the data-bus device information stored in the first storing means; and means for generating and allocating device identity information for each item of manufacturer's apparatus information stored in the first storing means, wherein the receiving and supplying means receives data and associated device identity information from the apparatus cooperating with the data bus device, and supplies the data to a further data bus device identified by the device identity information.

5. The data bus device as claimed in claim 1, characterized in that the data bus device is included in the apparatus cooperating with said data bus device.

6. An apparatus for cooperating with at least one apparatus and constructed to communicate with further data bus devices each cooperating with at least one further apparatus via a data bus, said data bus device comprising:

means for setting up said data bus device, said setting up means generating a reference table after the occurrence of a bus reset, the reference table containing data-bus device information for each further data bus device of a further apparatus connected to the data bus device, said data-bus device information identifying the further apparatus and the cooperating further data bus device until a next occurrence of a bus reset;

first means for storing the data-bus device information contained in the reference table;

means for requesting additional information from a further data bus device identified by data-bus device information, and for storing received additional information in the first storing means in allocated relationship to the data-bus device information of the further data bus device;

means for receiving data from the apparatus cooperating with the data bus device, and for supplying the data to a further data bus device identified by data-bus device information; and second means for storing manufacturer's apparatus information identifying the apparatus which cooperates with the data bus device, characterized in that said data bus device further comprises:

means for requesting manufacturer's apparatus information, after a first generation of a reference table by the setting up means as a result of a connection of the data bus device to the data bus, from all the further data bus devices each identified by respective data-bus device information contained in the reference table, and for storing the manufacturer's apparatus information received from the further data bus devices in allocated relationship to the data-bus device information stored in the first storing means; and means for requesting, after each subsequent generation of a reference table after the occurrence of a bus reset by the setting up means, manufacturer's apparatus information from a further data bus device identified by data-bus device information contained in the reference table, and for comparing received manufacturer's apparatus information with manufacturer's apparatus information already stored in the first storing means, said requesting and comparing means, in the case of matching of the received and the stored manufacturer's apparatus information, further storing the data-bus device information already contained in the reference table in allocated relationship to the matching manufacturer's apparatus information of the further data bus device already stored in the first storing means.

7. The apparatus as claimed in claim 6, characterized in that, if manufacturer's apparatus information received from a further data bus device identified by data-bus device information already contained in the reference table and manufacturer's apparatus information already stored in the first storing means do not match, the requesting and comparing means further stores the received manufacturer's apparatus information in the first storing means in allocated relationship to data-bus device information already contained in the reference table.

8. The apparatus as claimed in claim 6, characterized in that, after termination of a comparison of all the manufacturer's apparatus information received from the further data bus devices which are each identified by data-bus device information already contained in the reference table with manufacturer's apparatus information already stored in the first storing means, the requesting and comparing means further stores, in allocated relationship, identification information for each item of data-bus device information stored in the first storing means and additional information of further data bus devices to which no data-bus device information has been allocated after a last occurrence of a bus reset.

9. An apparatus for cooperating with at least one apparatus and constructed to communicate with further data bus devices each cooperating with at least one further apparatus via a data bus, said data bus device comprising:

means for setting up said data bus device, said setting up means generating a reference table after the occurrence of a bus reset, the reference table containing data-bus device information for each further data bus device of a further apparatus connected to the data bus device, said data-bus device information identifying the further apparatus and the cooperating further data bus device until a next occurrence of a bus reset;

first means for storing the data-bus device information contained in the reference table;

means for requesting additional information from a further data bus device identified by data-bus device information, and for storing received additional information in the first storing means in allocated relationship to the data-bus device information of the further data bus device;

means for receiving data from the apparatus cooperating with the data bus device, and for supplying the data to a further data bus device identified by data-bus device information; and second means for storing manufacturer's apparatus information identifying the apparatus which cooperates with the data bus device, characterized in that said data bus device further comprises:

means for requesting manufacturer's apparatus information, after a first generation of a reference table by the setting up means as a result of a connection of the data bus device to the data bus, from all the further data bus devices each identified by respective data-bus device information contained in the reference table, and for storing the manufacturer's apparatus information received from the further data bus devices in allocated relationship to the data-bus device information stored in the first storing means; and means for generating and allocating device identity information for each item of manufacturer's apparatus information stored in the first storing means, wherein the receiving and supplying means receives data and associated device identity information from the apparatus including the data bus device, and supplies the data to a further data bus device identified by the device identity information.

\* \* \* \* \*